United States Patent [19]

Klein et al.

[11] Patent Number: 4,801,323

[45] Date of Patent: Jan. 31, 1989

[54] METHOD OF MAKING A DISCHARGE VESSEL FOR COMPACT LOW-PRESSURE DISCHARGE LAMPS

[75] Inventors: Lutz Klein; Ernst Panofski; Gerd-Otto Eckstein; Hans Schmidt; Josef Plischke, all of Augsburg, Fed. Rep. of Germany

[73] Assignee: Patent Treuhand-Gesellschaft fur elektrische Gluhlampen mbH, Munich, Fed. Rep. of Germany

[21] Appl. No.: 51,909

[22] Filed: May 19, 1987

[30] Foreign Application Priority Data

May 21, 1986 [DE] Fed. Rep. of Germany ....... 3616986
Mar. 10, 1987 [DE] Fed. Rep. of Germany ....... 3707679

[51] Int. Cl.⁴ .............................................. C03B 23/08
[52] U.S. Cl. .......................................... 65/108; 65/110
[58] Field of Search ................... 65/64, 102, 108–111, 65/120, DIG. 9; 445/26

[56] References Cited

U.S. PATENT DOCUMENTS

| | | | |
|---|---|---|---|
| 1,948,560 | 2/1954 | Borneman | 65/108 |
| 2,392,104 | 1/1946 | Smith | 65/109 |
| 3,263,852 | 8/1966 | Fridrich | . |
| 3,679,385 | 7/1972 | Senft | . |
| 3,852,054 | 12/1974 | Dichter | 65/109 |
| 4,319,162 | 3/1982 | Hoch | 313/487 |
| 4,422,863 | 12/1983 | Hosoya et al. | 65/108 |
| 4,433,994 | 2/1984 | Fujimura et al. | 65/108 |
| 4,481,442 | 11/1984 | Albrecht et al. | 445/26 |

FOREIGN PATENT DOCUMENTS

| | | | |
|---|---|---|---|
| 3544465 | 6/1986 | Fed. Rep. of Germany | 65/108 |
| 2322448 | 3/1977 | France | . |
| 58-14447 | 1/1983 | Japan | 65/108 |
| 645945 | 2/1979 | U.S.S.R. | 65/110 |

Primary Examiner—Arthur Kellogg
Attorney, Agent, or Firm—Frishauf, Holtz, Goodman & Woodward

[57] ABSTRACT

A tubular discharge vessel for a compact low pressure discharge lamp, especially a compact fluorescent lamp, is formed by heating and bending a straight glass tube into a U-shape with a plurality of straight sections and a 180°-bend. Adequate vessel wall thickness is assured at the tubular sections where the bends are formed, by first heating a central section, moving sections lateral to the central section axially toward one another, thereby compressing the heated central section and thickening its walls, and bending or rotating the lateral sections into a parallel orientation. This prevents the bending process from unduly thinning the vessel walls, leading to breakage or rupture under internal gas pressure.

18 Claims, 5 Drawing Sheets

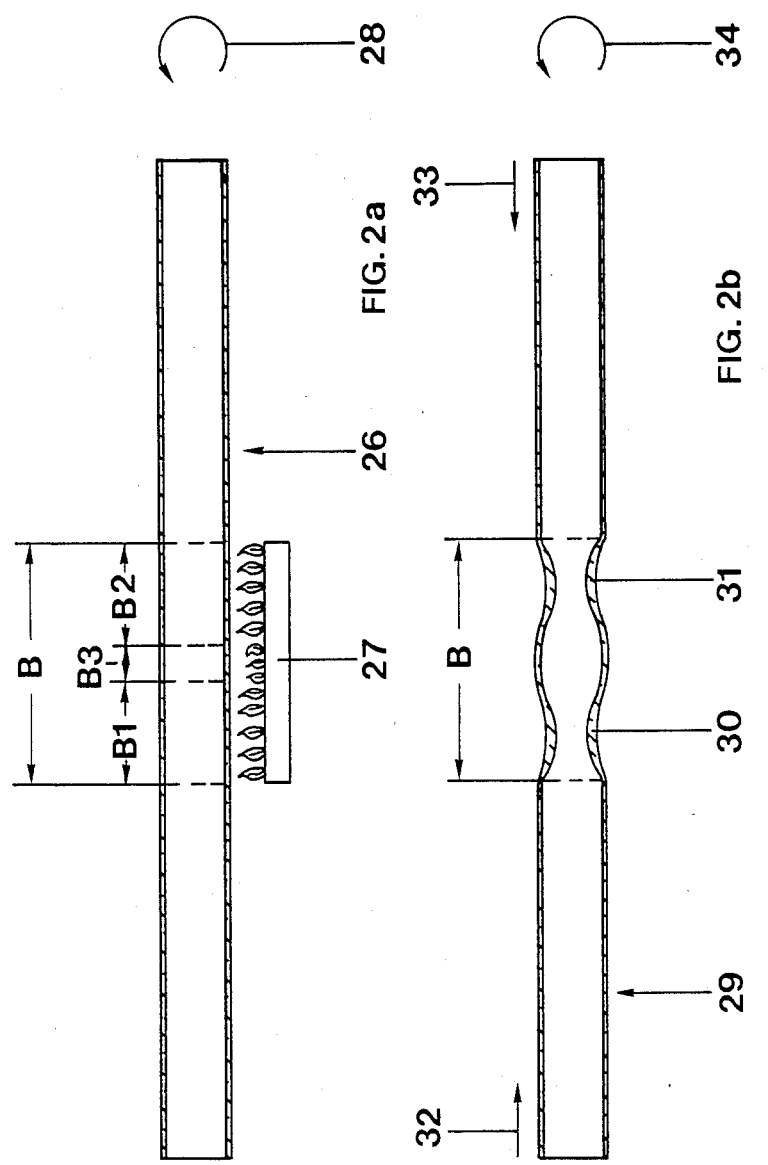

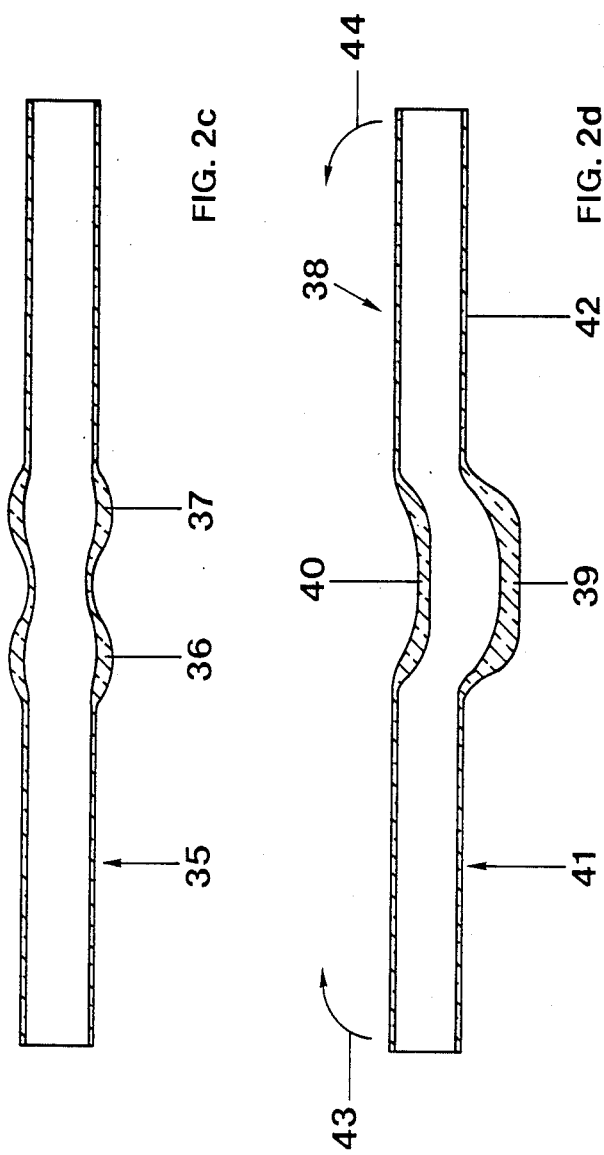

METHOD OF MAKING A DISCHARGE VESSEL FOR COMPACT LOW-PRESSURE DISCHARGE LAMPS

The present invention relates generally to a method of manufacturing a generally U-shaped, single-bend or multiple-bend tubular discharge vessel for a compact low-pressure discharge lamp, and more particularly to a method in which adequate wall thickness is assured at the tubular sections where the bends are formed.

BACKGROUND

A method of manufacturing a tubular discharge vessel that has been bent several times and is intended for an electric discharge lamp is known from U.S. Pat. No. 4,319,162, HOEH, and the corresponding German Patent Disclosure Document No. 30 05 052. The bends are made by heating a substantially straight glass tube at the region intended for bending until the glass tube softens, whereupon the heated region of the glass tube is bent about a mold by moving the non-heated tube sections in the respective directions.

U.S. Pat. No. 4,481,442, ALBRECHT et al., and corresponding European Patent Specification No. 61 758, also describe a method of manufacturing a tubular discharge vessel bent once or several times and intended for a low-pressure mercury vapor discharge lamp. The tube sections of a straight glass tube that are to be bent are heated to softening temperature, and the 180°-bend is manufactured by bending the adjacent tube sections towards one another. Thereafter, the 180°-bend is placed into a mold, compressed air is blown into the tube ends, and there is provided a U-shaped bend corresponding to the mold and having substantially rectangular corners. The rectangular corners serve as the cold spots for the optimal operation of the lamp.

In the manufacture of the 180°-bends, the wall thickness of the glass tube decreases at the outer surface area of the bend owing to the bending operation itself. When a 180°-bend is made that has substantially rectangular corners, there is an even stronger decrease in wall thickness. Because of the thin tube wall, the discharge vessels are particularly subject to breakage at these locations.

This hazard of breakage may be eliminated when, in the manufacture of the discharge vessel, a glass tube is used whose wall is sufficiently thick in order that, upon manufacture of the 180°-bends, the thickness of the glass wall at the outer surface area will not fall below a certain minimum thickness. However, a considerable increase in the weight of both the discharge vessel and the finished lamp, as well as higher costs, have to be accepted.

THE INVENTION

It is an object of the invention to provide a method of manufacturing a generally U-shaped discharge vessel of glass that is bent at least once and wherein, in spite of the use of a straight glass tube whose wall thickness is only sufficient for the straight tube sections, a certain minimum wall thickness is assured even in those regions of the bends where the bend is substantial. More specifically, the weight of the discharge vessel should not be increased substantially.

Briefly, a central section is first heated. Tube sections lateral to the central section are moved axially toward one another, thereby compressing the heated central section and thickening its walls. The lateral are then bent, or rotated into a parallel orientation. During the bending or rotation process, the wall thickness at the outer corners, previously thickened is reduced again. The walls of the straight sections are not thickened, so there is no unnecessary overall increase in weight or glass consumption.

The distribution of the glass is particularly critical when the generally U-shaped 180°-bend is to have an inner diameter, in the region of the apex of the bend, that is larger than the inner diameter of the originally straight glass tube. Bent discharge tube sections of this type are required particularly for compact low-pressure discharge lamps with high wall loading. A substantially more controlled distribution of the glass in the region of the bend may be reached when the glass is heated to a higher temperature at the two off-center regions of the tube section required for the bend than at the intermediate center region.

When glass tubes having a small wall thickness are to be bent, it is necessary that, during the prior compression, or upsetting operation, a slight positive pressure be produced in the glass tube by blowing air into the glass tube. This prevents the glass tube from collapsing in the region where it has been upset and precludes a decrease of the inner diameter of the tube.

From the point of view of the glass working or handling, the easiest way to upset the glass is to also rotate the glass tube about its longitudinal axis while it is first being heated and while it is upset when soft. When the glass tube is not rotated while it is heated and then upset, the glass may re-distribute more readily at a downward location, owning to gravity. In the latter case, the bending of the tube is to be carried out such that the glass quantity that has collected at the lower wall portion of the glass tube be used to provide the outer surface area. Wide bends with rectangular corners may thus be manufactured with the quantity of glass that has collected at the lower wall portion of the glass tube without having to accept a decrease in the wall thickness of the glass tube in the region of the bend. Such a method, however, is complex; more specifically, it requires complicated flame arrangements, and it may also necessitate the use of a stream of air.

In order to obtain rectangular corners at the 180°-bend, the bend can be placed into a suitable mold and the corners can be formed by blowing compressed air into the glass tube through the ends thereof. In the finished discharge vessel, the rectangular corners serve as the cold spots which control the vapor pressure in the discharge vessel and thus the luminous efficacy.

DRAWINGS

The method will now be described in greater detail by way of two different operating modes illustrated by the FIGS. 1a, to 1e and 2a to 2d.

DETAILED DESCRIPTION

Figure 1A:
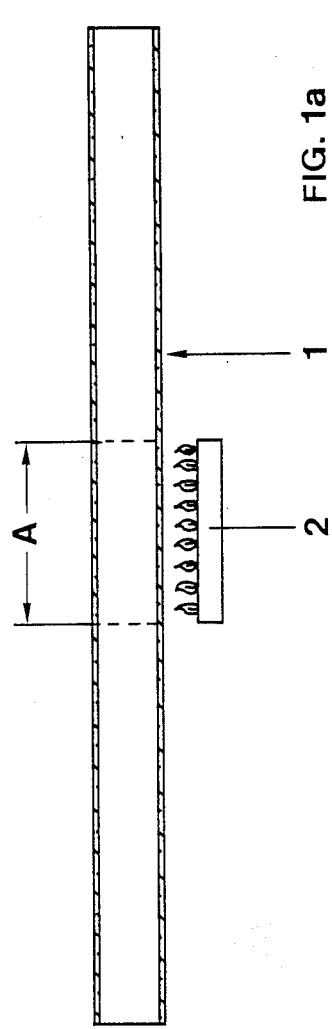

The FIGS. 1a to 1e show the individual steps in the manufacture of a tubular discharge vessel having only one bend with substantially rectangular corners. First, as illustrated in FIG. 1a, the tube section A of a straight glass tube 1, required for the 180°-bend, is heated by a gas burner 2 until it softens. The glass tube is not rotated while it is heated. As indicated below, this is advantageous with respect to the thickness of the glass wall in the bending operation.

Figure 1B:
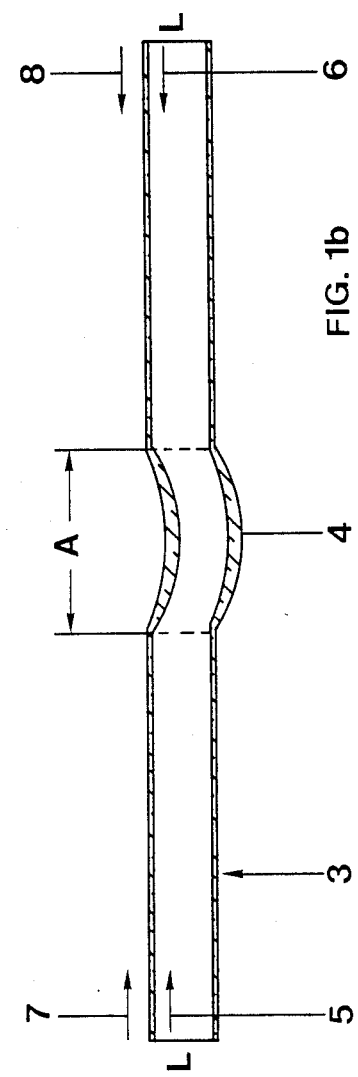

As shown in FIG. 1b, the glass tube 3 is constricted at 4 in the heated section A. Thereafter, air is blown into the two ends of the glass tube as indicated by the two arrows 5 and 6 marked L. At the same time, the ends of the glass tube are moved towards one another in the direction of the arrows 7 and 8, so that the glass tube is upset at the constriction 4.

Figure 1C:
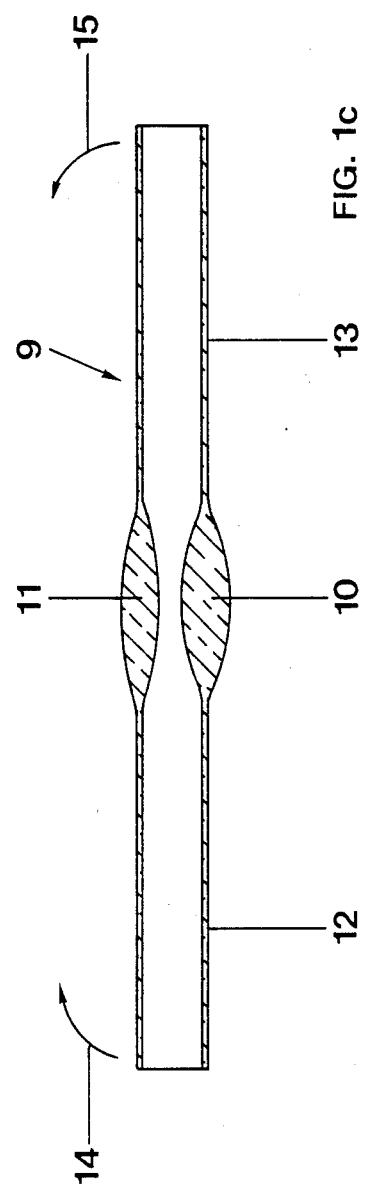

FIG. 1c illustrates the glass tube 9 after it has been upset. In the region in which the tube has been upset, the distribution of the glass is not a uniform one, since the gravity has caused the glass to flow increasingly towards the lower wall portion of the glass tube upon the heating carried out in the first operating step. The glass quantity 10 that has collected at the lower wall portion of the tube 9 is thus greater than the quantity at the upper wall portion 11 of the tube. A 180°-bend is now carried out by bending the tube sections 12, 13, located laterally of the upset region, upward and towards one another as indicated by the arrows 14 and 15. The tube is bent upwardly in order that the larger glass quantity 10 at the lower wall portion of the tube 9 may be used for the outer surface area at the 180°-bend.

Figure 1D:
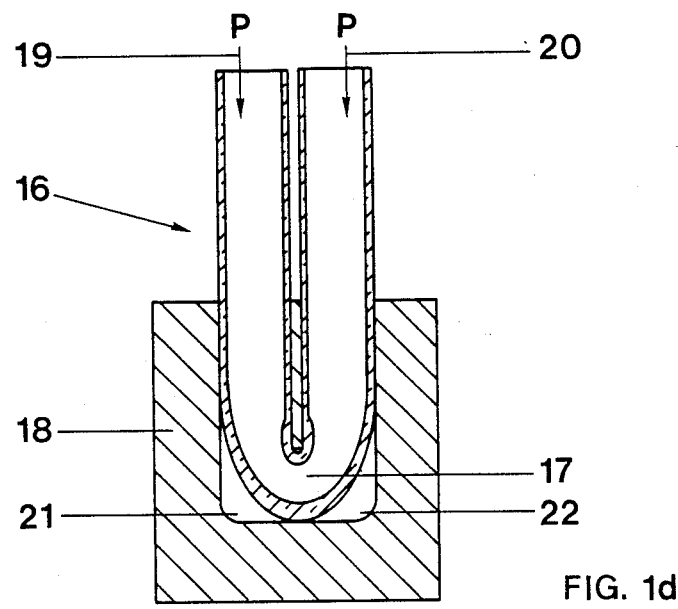

As illustrated in FIG. 1d, the bent glass tube 16 having the 180°-bend 17 is subsequently placed in a mold 18 of metal. Compressed air, indicated in the drawing by the arrows 19 and 20 and marked P, is blown into the two ends of the bent glass tube 16, and the glass tube 16 is thus blown into the rectangular corners 21 and 22 of the mold 18, thus thinning the previously thickened glass walls.

Figure 1E:
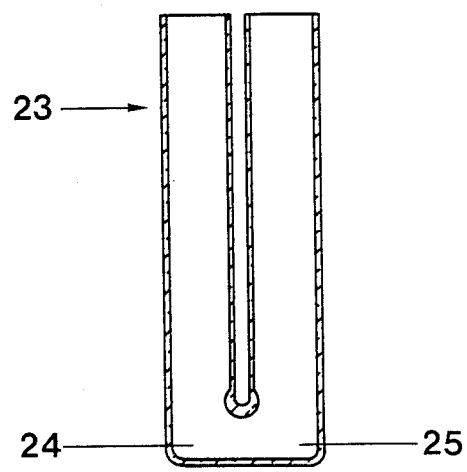

FIG. 1e shows the finished discharge vessel 23 having a 180°-bend and two substantially rectangular corners 24, 25 with the wall thickness of the glass at the corners commensurate with the straight tube sections 12, 13.

FIGS. 2a to 2d show a modification of the steps in the manufacture of an upset portion at a straight glass tube. Here, in the section B required for the 180°-bend, the glass tube 26 is heated—in accordance with FIG. 2a—by a burner 27 with unequal flame distribution until the glass tube softens in the heated region. The two off-center regions B1, B2 are heated to a higher temperature than the intermediate center region B3. For this purpose, instead of one gas burner having an unequal flame distribution, several different gas burners with a certain spacing from one another may be used. At the same time, the tube 26 is rotated about its axis—as illustrated by the curved arrow 28—so as to be heated as uniformly as possible about its entire circumference. If discharge vessels for highly loadable low-pressure discharge lamps are to be manufactured that require a "high-current arc", i.e. a larger diameter in the apex of the bend, then, in this case, as mentioned above, there should be no rotation of the glass tube about its axis for distributing the glass in a more controlled manner.

As shown in FIG. 2b, the glass tube 29 will thus have two constricted regions 30, 31 in the heated tube section B disposed at a small distance from one another. The ends of the tube 29 are then moved towards one another in the direction of the arrows 32, 33 so that the tube 29 is upset at the constricted regions 30, 31. The tube is rotated about its axis, as indicated by the arrow 34, to ensure a high degree of uniformity during this upsetting step.

FIG. 2c shows the glass tube 35 with the two thickened regions 36, 37 after the upsetting step. The glass tube 35 is now subjected to a uniform heating without being rotated any longer about its own axis. Owing to gravity, the glass flows downward increasingly so that, as illustrated in FIG. 2d, the glass quantity 39 collected at the lower wall portion of the tube 38 is larger than the quantity 40 remaining at the upper wall portion. The two straight tube sections 41, 42 laterally of the upset region are now bent upwardly, as illustrated by the arrows 43, 44 so that a 180°-bend results. The further steps required to provide a 180°-bend with rectangular corners are analogous to the steps of the FIGS. 1d and 1e.

Various changes and modifications are possible within the scope of the inventive concept, and features of one embodiment may be combined with features of another embodiment.

We claim:

1. A method of making, from a straight glass tube (1, 26), a tubular, generally U-shaped discharge vessel (23), having at least one bend therein, for use in a compact low-pressure discharge lamp, said discharge vessel having two straight tube sections (12, 13; 41, 42) and a cross connecting section which forms, with the straight tube sections, connecting corners, said cross connecting section connecting said straight tube sections by a 180°-bend, comprising the steps of heating said glass tube (1, 26) over a length at least encompassing the length of the cross connecting section, at a predetermined central tube portion (A, B) thereof intended for use in forming a 180°-bend, until said portion softens while leaving lateral straight portions (12, 13; 41, 42) which extend laterally from said heated and softened central tube portion;

axially moving the lateral straight portions (12,—13; 41, 42) towards one another in the direction of the heated tube portion (A, B), thereby compressing said heated tube portion and thickening the walls of the tube at said central tube portion (A, B); and bending, or rotating said lateral straight tube portions (12, 13; 41, 42), extending laterally of the thus thickened heated central tube portion (A, B), towards one another until they are aligned substantially parallel to one another in a generally U-shaped configuration, to form said straight tube sections, thereby making the cross connecting section at a predetermined location in the glass tube (1, 26) and having, after bending at said 180° bend, walls at the connecting corners which are thinner than the previously thickened walls at said central tube portion with a wall thickness of the glass at the connecting corners commensurate with the wall thickness of the straight tube sections (12, 13; 41, 42).

2. A method as claimed in claim 1, wherein said heating step comprises heating two off-center regions (B1, B2) of said predetermined central tube portion (B), intended to form the connecting corners of the cross connecting section, of the straight glass tube (26) to a higher temperature than the center region (B3) of said predetermined central tube portion.

3. A method as claimed in claim 1, further comprising rotating the glass tube (26,29) about its longitudinal axis during said heating and compression steps.

4. A method as claimed in claim 1, further comprising keeping said glass tube (1, 3) essentially stationary with respect to its longitudinal axis during said heating and compression steps.

5. A method as claimed in claim 1, further comprising generating a slight positive pressure within the glass tube (3) by blowing air into it during said compression step.

6. A method as claimed in claim 1, comprising the subsequent steps of placing said 180°-bent (17) glass tube (16), after said bending step, into a mold (18) having, in cross section, essentially rectangular corners; and forming the rectangular corners (24, 25) of the cross connecting section by blowing compressed air into ends of said glass tube to reinforce the wall thickness at the corners of the cross connecting section with a wall thickness of glass at the essentially rectangular corners commensurate with the wall thickness of the straight tube sections (12, 13).

7. A method of making, from a straight glass tube (1, 26), a tubular discharge vessel (23), having at least one generally U-shaped bend therein for use in a compact low-pressure discharge lamp, said discharge vessel having a plurality of straight tube sections and a cross connecting section which forms, with the straight tube sections, connecting corners, said cross connecting section connecting said straight tube sections, by a 180°-bend, comprising the steps of heating said straight glass tube (1, 26) at a predetermined central tube portion (A,B) thereof, intended for use in forming the 180°-bend, until said portion softens while leaving lateral straight portions (12, 13; 41, 42) which extend laterally from said heated and softened central tube portion;

thickening the walls of said heated central tube portion where the bend is to be made by axially moving towards one another, in the direction of the heated tube portion, the lateral straight portions (A, B); and bending, or rotating said straight tube portions (12, 13; 41, 42), towards one another until they are aligned substantially parallel to one another to form said pair of straight tube sections, thereby making a 180°-bend (17) at a predetermined location in the glass tube (1, 26) and forming the cross connecting section and having, at the connecting corners, walls which are thinner than the previously thickened walls at said central portion with a wall thickness of the glass at the connecting corners commensurate with the wall thickness of the straight tube sections (12, 13; 41, 42).

8. A method as claimed in claim 6, wherein the compression step comprises thickening the walls of the tube at the central tube portion (A, B) by an extent such that, upon subsequent bending or rotation of the tube, the wall thickness at the resulting rectangular corners (24, 25) of the bent section (17) will be substantially similar to the wall thickness of the straight tube sections (12, 13; 41, 42).

9. A method as claimed in claim 8, wherein said heating step comprises heating two off-center regions (B1, B2) of said predetermined central tube portion (B), intended for carrying out the 180°-bend, of the straight glass tube (26) to a higher temperature than the center region (B3) of said predetermined central tube portion.

10. A method as claimed in claim 8, further comprising generating a slight positive pressure within the glass tube (3) by blowing air into it during said compression.

11. A method as claimed in claim 7, wherein said heating-step comprises heating two off-center regions (B1, B2) of said predetermined central tube portion (B), intended for carrying out the 180°-bend, of the straight glass tube (26) to a higher temperature than the center region (B3) of said predetermined central tube portion.

12. A method as claimed in claim 7, further comprising rotating the glass tube (26, 29) about its longitudinal axis during said heating and compression steps.

13. A method as claimed in claim 7, further comprising keeping said glass tube (1, 3) essentially stationary with respect to its longitudinal axis during said heating and compression steps.

14. A method as claimed in claim 7, further comprising generating a slight positive pressure within the glass tube (3) by blowing air into it during said compression step.

15. A method as claimed in claim 7, comprising the subsequent steps of placing said 180°-bent (17) glass tube (16), after said bending step, into a mold (18) having, in cross section, essentially rectangular corners; and forming rectangular corners (24, 25) at the 180°-bend by blowing compressed air into ends of said glass tube with the wall thickness of the corners at the 180°-bend being thin with respect to the walls of the central tube portion (A, B) which has been thickened during said compression step.

16. A method as claimed in claim 15, wherein the compression step comprises thickening the walls of the tube at the central tube section (A, B) by an extent such that, upon subsequent bending or rotation of the tube, the wall thickness at the resulting rectangular corners (24, 25) of the bent portion (17) will be substantially similar to the wall thickness of the straight tube sections (12, 13; 41, 42).

17. A method as claimed in claim 15, wherein said heating step comprises heating two off-center regions (B1, B2) of said predetermined central tube portion (B), intended for carrying out the 180°-bend, of the straight glass tube (26) to a higher temperature than the center region (B3) of said predetermined central tube portion.

18. A method as claimed in claim 15, further comprising generating a slight positive pressure within the glass tube (3) by blowing air into it during said compression step.

* * * * *